US011997467B2

(12) United States Patent
Zhou

(10) Patent No.: US 11,997,467 B2
(45) Date of Patent: May 28, 2024

(54) MULTI-INPUT-DRIVING SMALL LOUDSPEAKER AND MID-TREBLE LOUDSPEAKER

(71) Applicant: SUZHOU RUSHENG ELECTRONICS CO., LTD., Jiangsu (CN)

(72) Inventor: Jianming Zhou, Suzhou (CN)

(73) Assignee: SUZHOU RUSHENG ELECTRONICS CO., LTD., Jiangsu (CN)

( * ) Notice: Subject to any disclaimer, the term of this patent is extended or adjusted under 35 U.S.C. 154(b) by 199 days.

(21) Appl. No.: 17/623,287

(22) PCT Filed: Oct. 23, 2019

(86) PCT No.: PCT/CN2019/112651
§ 371 (c)(1),
(2) Date: Dec. 28, 2021

(87) PCT Pub. No.: WO2021/007982
PCT Pub. Date: Jan. 21, 2021

(65) Prior Publication Data

US 2022/0369040 A1 Nov. 17, 2022

(30) Foreign Application Priority Data

Jul. 15, 2019 (CN) ........................ 201910634995.X

(51) Int. Cl.
*H04R 9/06* (2006.01)
*H04R 9/02* (2006.01)

(52) U.S. Cl.
CPC ............. *H04R 9/063* (2013.01); *H04R 9/025* (2013.01); *H04R 9/06* (2013.01)

(58) Field of Classification Search
CPC ........... H04R 9/063; H04R 9/025; H04R 9/06
See application file for complete search history.

(56) References Cited

U.S. PATENT DOCUMENTS 3,509,290 A * 4/1970 Ishimura .................. H04R 1/24 381/431
4,252,211 A * 2/1981 Matsuda .................. H04R 7/26 181/173
(Continued)

FOREIGN PATENT DOCUMENTS

CN 102984609 A 3/2013
CN 106341761 A 1/2017
(Continued)

OTHER PUBLICATIONS

International Search Report for PCT/CN2019/112651 dated Apr. 7, 2020.

*Primary Examiner* — Suhan Ni
(74) *Attorney, Agent, or Firm* — Schmeiser, Olsen & Watts, LLP

(57) ABSTRACT

Provided is a small loudspeaker and a mid-treble loudspeaker with multi-input-drives, which increases the sensitivity of the small loudspeaker, improves the intelligibility of the small loudspeaker, and reduces the distortion, wherein the mid-treble loudspeaker with multi-input-drives comprises a sound membrane support, a sound membrane arranged on the sound membrane support, and a plurality of input driving mechanisms, each of the input driving mechanism comprises includes a voice coil and a magnetic circuit assembly for driving the voice coil to vibrate.

10 Claims, 5 Drawing Sheets

(56) References Cited

U.S. PATENT DOCUMENTS

| | | | | |
|---|---|---|---|---|
| 2005/0031153 A1* | 2/2005 | Nguyen | ................. | H04R 9/025<br>381/400 |
| 2009/0310808 A1* | 12/2009 | Button | ................. | H04R 1/2853<br>381/339 |

FOREIGN PATENT DOCUMENTS

| | | | |
|---|---|---|---|
| CN | 208079377 | U | 11/2018 |
| CN | 110248297 | A | 9/2019 |
| EP | 3355590 | A1 | 8/2018 |

* cited by examiner

MULTI-INPUT-DRIVING SMALL LOUDSPEAKER AND MID-TREBLE LOUDSPEAKER

CROSS-REFERENCE TO RELATED APPLICATIONS

This application claims priority to PCT Application No. PCT/CN2019/112651, having a filing date of Oct. 23, 2019, which is based on CN 201910634995.X, having a filing date of Jul. 15, 2019, the entire contents both of which are hereby incorporated by reference.

FIELD OF TECHNOLOGY

The following relates to the loudspeaker field, in particular to a small loudspeaker and mid-treble loudspeaker with multi-input-drives.

BACKGROUND

The existing traditional small loudspeakers generally adopt a structure comprising a dish-shaped cone of plastic film combined with a voice coil, a groove for fixing the voice coil is arranged at the center of the bottom of the cone, and one end of the voice coil with a single signal input is fixed on the center groove of the bottom of the cone to form a small loudspeaker vibration system, and this small loudspeaker can only be used for single-channel signal input, while single-channel audio signal input has limitations on the original sound reproduction, and the combination of a single voice coil and the cone has a higher requirement of the rigidity for the cone. Or, a fixed voice coil step is arranged at the center of the bottom of the cone, and one end of the voice coil with multi-signal input is fixed on the center step of the bottom of the cone, where the voice coil is formed by stacking multiple sets of coils from inside to outside, to form a small loudspeaker vibration system, and this small loudspeaker can be used for multi-signal input, however, since this type of loudspeaker has multiple sets of coils wound on one voice coil, the weight of the voice coil is increased, and the sensitivity of the small loudspeaker may be reduced, which has limitations on the reproduction of the original sound.

For mid-treble loudspeakers, most generally adopt a structure comprising a dome sound membrane combined with a voice coil, one end of the voice coil is directly fixed on a center groove on the opposite side of the dome sound membrane to form a treble vibration system, and this mid-treble loudspeaker can only be used for single-channel signal input, while single-channel audio signal input has limitations on the original sound reproduction, and the combination of a single voice coil and the sound membrane has a higher requirement of the rigidity for the sound membrane. Or, a fixed voice coil step is arranged at the center of the bottom of the sound membrane, and one end of the voice coil with multi-signal input is fixed on the center step of the bottom of the sound membrane, where the voice coil is formed by stacking multiple sets of coils from inside to outside, to form a mid-treble vibration system, and this mid-treble loudspeaker can be used for multi-signal input, however, since this type of loudspeaker has multiple sets of coils wound on one voice coil, the weight of the voice coil is increased by winding multiple sets of coils on one voice coil, and the sensitivity of the mid-treble loudspeaker may be reduced, which has limitations on the reproduction of the original sound.

SUMMARY

FAn aspect relates to a small loudspeaker with multi-input-drives, which increases the sensitivity of the small loudspeaker, improves the intelligibility of the small loudspeaker, and reduces the distortion. The second purpose of the present disclosure is to provide a mid-treble loudspeaker with multi-input-drives, which increases the sensitivity of the mid-treble loudspeaker, improves the intelligibility of the mid-treble loudspeaker, and reduces the distortion.

In the present disclosure, "multi-input" refers to multiple audio signal inputs; "multi-input driving" refers to multiple audio signals input to multiple voice coils, and the multiple voice coils jointly drive the loudspeaker to produce sound.

To achieve the above purpose, a technical solution employed by the present disclosure is: a small loudspeaker with multi-input-drives, comprising a frame, and a cone arranged on the frame, the small loudspeaker further comprises a plurality of input driving mechanisms, each of the input driving mechanisms comprises a voice coil and a magnetic circuit assembly for driving the voice coil to vibrate, each of the magnetic circuit assemblies comprises a U-yoke having an inner cavity, a magnetic steel and a magnetic pole core arranged within the U-yoke, a magnetic gap is formed between an inner wall of the U-yoke and the magnetic steel or the magnetic pole core, the voice coil is inserted in the magnetic gap and capable of moving in an up-and-down direction; a plurality of magnetic circuit mounting holes are opened on the frame, and at most one U-yoke is arranged below each of the magnetic circuit mounting holes, and the voice coils respectively pass through the corresponding magnetic circuit mounting holes, and lower portions of the voice coils are respectively inserted into the magnetic gaps; the cone has a flat-sheet cone bottom, a plurality of voice coil mounting holes are opened on the cone bottom, and at most one voice coil is arranged at each voice coil mounting hole.

The small loudspeaker in the present disclosure is a small loudspeaker without damper. Here, the term "small loudspeaker" refers to a loudspeaker with a size of less than 100 mm, which is suitable for use in headsets and other equipment, with a frequency range of 50 to 15000 Hz.

In an embodiment, there are three or more of the input driving mechanisms, and the three or more input driving mechanisms are arranged at equal intervals along a circle. In a loudspeaker with voice coils that are generally circular, the plurality of input driving mechanisms are arranged circularly and evenly.

In an embodiment, the three or more input driving mechanisms are arranged linearly, or in an array. In a generally oval or rectangular loudspeaker, the plurality of input driving mechanisms are arranged linearly or in an array, and the cone adopts an oval shape or a rectangular shape.

In an embodiment, the cone has a cone bottom that is a round flat-sheet, and a center of the circle coincides with a center of the cone bottom.

In an embodiment, three or more voice coil mounting holes are arranged on the cone bottom, the voice coil mounting holes are arranged at equal intervals along the circle, and each of the voice coil mounting holes is provided with one of the voice coils to connect the voice coils to the cone bottom.

In an embodiment, the cone further comprises a tapered edge portion extending obliquely upwards from an outer edge of the cone bottom, and the tapered edge portion is fixedly connected to the frame through a yoke ring.

In an embodiment, three or more magnetic circuit mounting holes are opened on the frame, the magnetic circuit mounting holes are arranged at equal intervals along the circle, and each of the magnetic circuit mounting holes is provided with one magnetic circuit assembly.

In an embodiment, the upper edge of the U-yoke is fixedly connected to a lower surface of the frame.

In an embodiment, the magnetic steel is neodymium magnetic steel or ferrite magnetic steel.

In an embodiment, each magnetic circuit assembly is composed of a U-yoke, and a magnetic pole core and a neodymium magnetic steel arranged within the U-yoke, and a lower surface of the magnetic pole core closely contacts an upper surface of the neodymium magnetic steel.

In an embodiment, multiple pairs of audio signal input terminals are arranged on an edge of the frame, and each pair of the audio signal input terminals are electrically connected to leads of one voice coil. It simplifies the connection of the product itself and facilitates the connection of audio signal input.

In an embodiment, the plurality of input driving mechanisms are arranged in circular, linear, or an array.

Another technical solution employed by the present disclosure is:

a mid-treble loudspeaker with multi-input-drives, comprising a sound membrane support, and a sound membrane arranged on the sound membrane support, the mid-treble loudspeaker further comprises a plurality of input driving mechanisms, each of the input driving mechanism comprises a voice coil and a magnetic circuit assembly for driving the voice coil to vibrate, each of the magnetic circuit assemblies comprises a U-yoke having an inner cavity, a magnetic steel and a magnetic pole core arranged within the U-yoke, a magnetic gap is formed between an inner wall of the U-yoke and the magnetic steel or the magnetic pole core, the voice coil is inserted in the magnetic gap and capable of moving in an up-and-down direction; a plurality of magnetic circuit mounting holes are opened on the sound membrane support, and at most one U-yoke is arranged at each magnetic circuit mounting hole, and the voice coils respectively pass through corresponding magnetic circuit mounting holes, and lower portions of the voice coils are respectively inserted into the magnetic gaps; a lower portion of the sound membrane is fixedly connected with a flat-sheet voice coil support, a plurality of voice coil mounting grooves are opened on the voice coil support, and at most one voice coil is arranged at each voice coil mounting groove.

The mid-treble loudspeaker in the present disclosure is a mid-treble loudspeaker without damper. Here, the term "mid-treble loudspeaker" refers to a loudspeaker with a frequency range of 1500 to 20000 Hz.

In an embodiment, there are three or more input driving mechanisms, the three or more input driving mechanisms are arranged at equal intervals along a circle, the voice coil support is round as a whole, and a center of the circumference coincides with a center of the voice coil support. In a loudspeaker with a voice coil support that is generally round, the plurality of input driving mechanisms are arranged circularly and evenly.

In an embodiment, the three or more input driving mechanisms are arranged linearly, or in an array. In a loudspeaker with a generally oval or rectangular voice coil support, the plurality of input driving mechanisms are arranged linearly or in an array. The sound membrane adopts an oval shape or a rectangular shape.

In an embodiment, three or more voice coil mounting grooves are opened on the voice coil support, the voice coil mounting grooves are arranged at equal intervals along the circle, and each of the voice coil mounting grooves is provided with one voice coil to connect the voice coil to the voice coil support; three or more magnetic circuit mounting holes are opened on the sound membrane support, the magnetic circuit mounting holes are arranged at equal intervals along the circle, and each of the magnetic circuit mounting holes is provided with one magnetic circuit assembly.

In an embodiment, the sound membrane has a spherical portion arched upwardly and a yoke ring around an outer edge of the spherical portion, and the yoke ring and the voice coil support are fixedly connected.

In an embodiment, the mid-treble loudspeaker further comprises a sound amplifying cover, and the sound amplifying cover is covered on the sound membrane.

In an embodiment, a though-hole is opened on a middle portion of the sound amplifying cover, and the sound amplifying cover has a sound amplifying portion surrounding the though-hole and arched upwardly.

In an embodiment, the upper edge of the U-yoke is fixedly connected to a lower surface of the sound membrane support.

In an embodiment, the magnetic steel is neodymium magnetic steel or ferrite magnetic steel.

In an embodiment, each of the magnetic circuit assemblies is composed of a U-yoke, and a magnetic pole core and a neodymium magnetic steel arranged within the U-yoke, and a lower surface of the magnetic pole core closely contacts an upper surface of the neodymium magnetic steel.

In an embodiment, multiple pairs of audio signal input terminals are arranged on an edge of the sound membrane support, and each pair of audio signal input terminals are electrically connected to leads of one voice coil. It simplifies the connection of the product itself and facilitates the connection of audio signal input.

In an embodiment, the plurality of input driving mechanisms are arranged in circular, linear, or an array.

Due to the use of the above technical solutions, the present disclosure has the following advantages over the conventional art:

in the small loudspeaker and the mid-treble loudspeaker with multi-input-drives of the present disclosure, the structure is ingenious and rational, and the original sound reproduction and distortion are better than that of traditional loudspeakers by receiving audio signal input via multiple voice coils; through the input-driving structure formed by a plurality of magnetic circuit assemblies, the sensitivity of the loudspeaker is increased, and the intelligibility of the loudspeaker is improved.

BRIEF DESCRIPTION

Some of the embodiments will be described in detail, with references to the following Figures, wherein like designations denote like members, wherein.

LIST OF REFERENCE SIGNS

1—frame; 10—magnetic circuit mounting hole; 2—cone; 20—voice coil mounting hole; 21—cone bottom; 22—tapered edge portion; 3—input drive mechanism; 31—voice coil; 310—lead; 32—magnetic pole core; 33—neodymium magnetic steel; 34—U-yoke; 4—yoke ring; 5—audio signal input terminal; 1'—sound membrane support; 10'—magnetic circuit mounting hole; 2'—sound membrane; 20'—spherical portion; 21'—yoke ring; 22'—voice coil support; 3'—input drive mechanism; 31'—voice coil; 310'—lead; 32'—magnetic pole core; 33'—neodymium magnetic steel; 34'—U-yoke; 4'—sound amplifying cover; 40'—though-hole; 41'—sound amplifying portion; 5'—audio signal input terminal.

DETAILED DESCRIPTION

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

Embodiment 1

Figure 1:
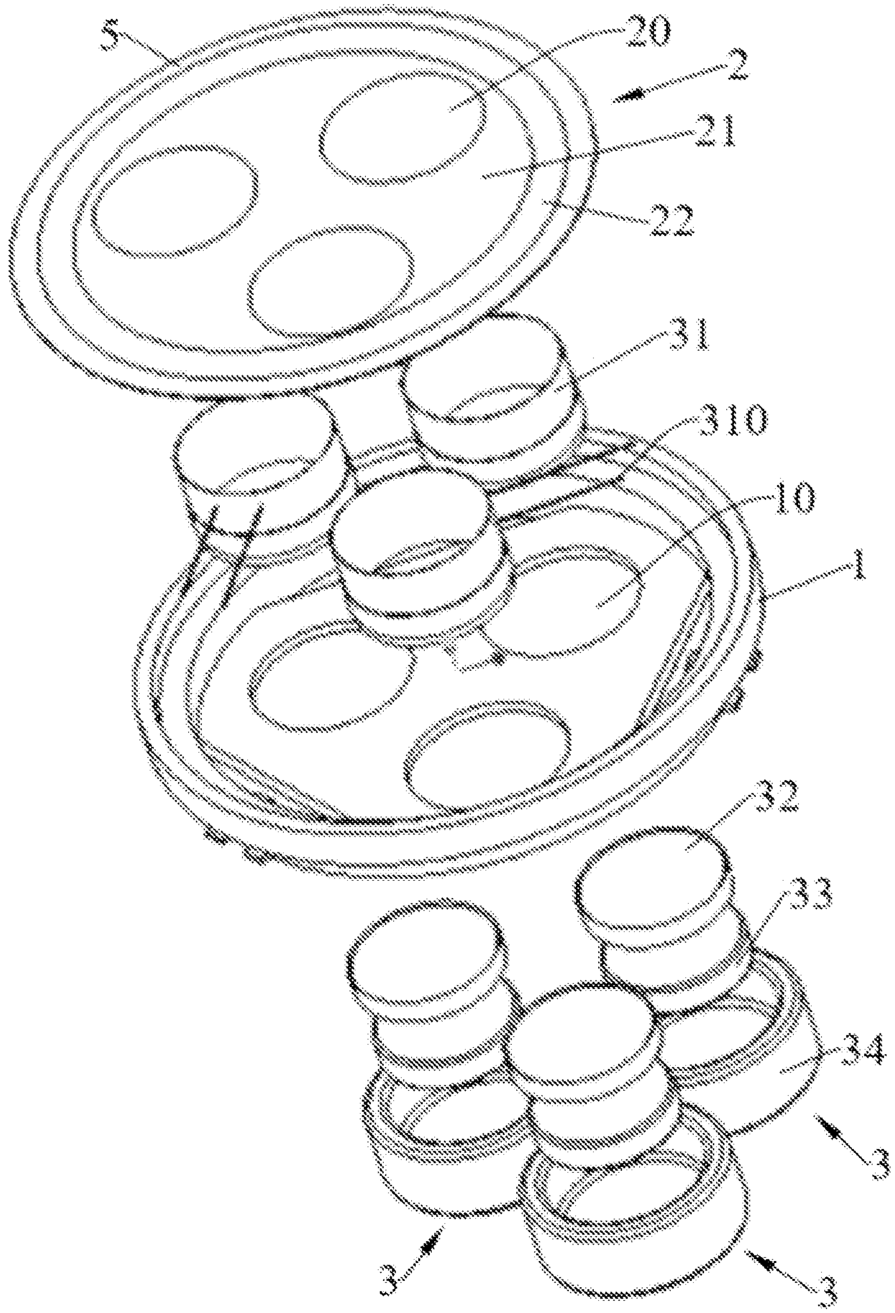
FIG. 1 is a schematic exploded view of a small loudspeaker according to Embodiment 1 of the present disclosure.
Figure 2:
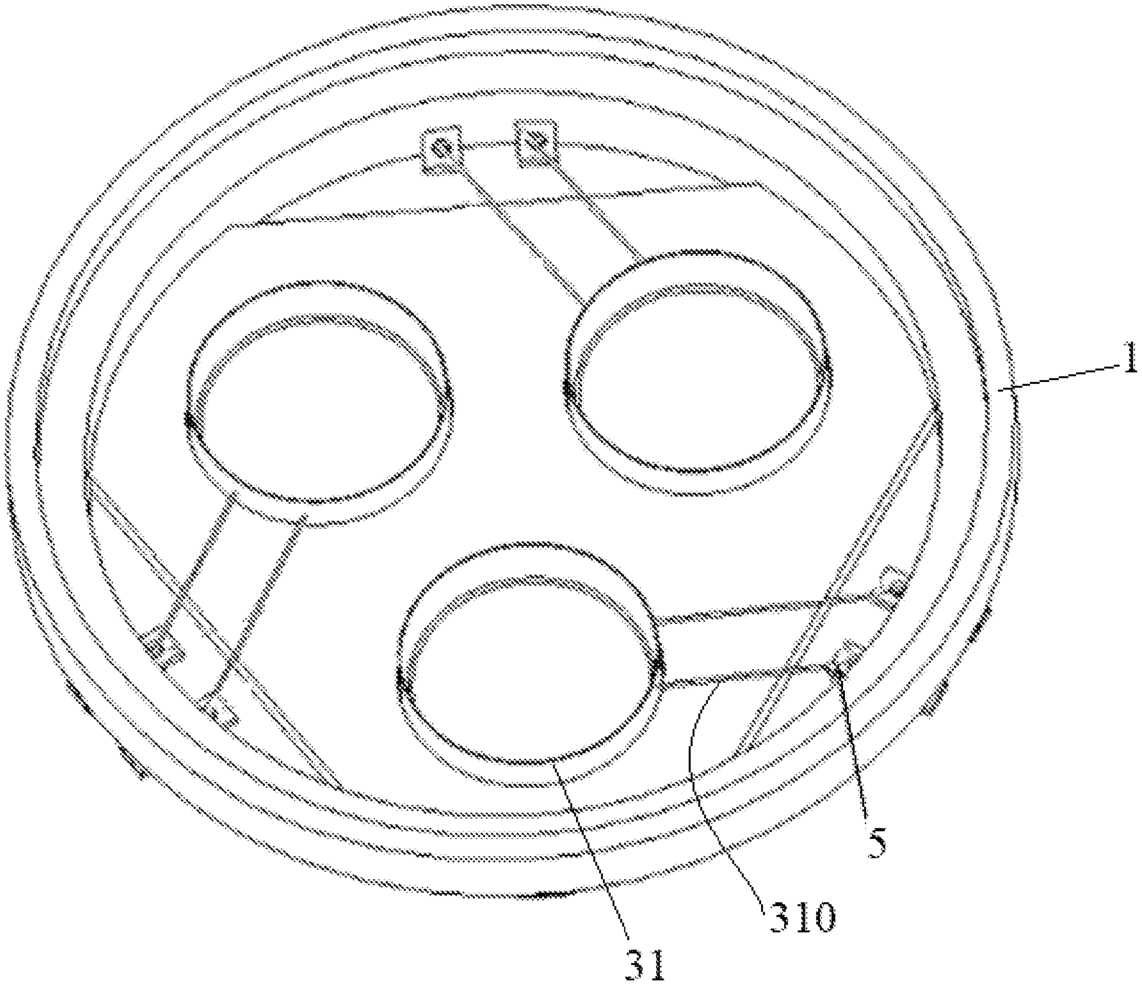
FIG. 2 is a schematic diagram of the frame in FIG. 1 after the voice coils are mounted.
Figure 3:
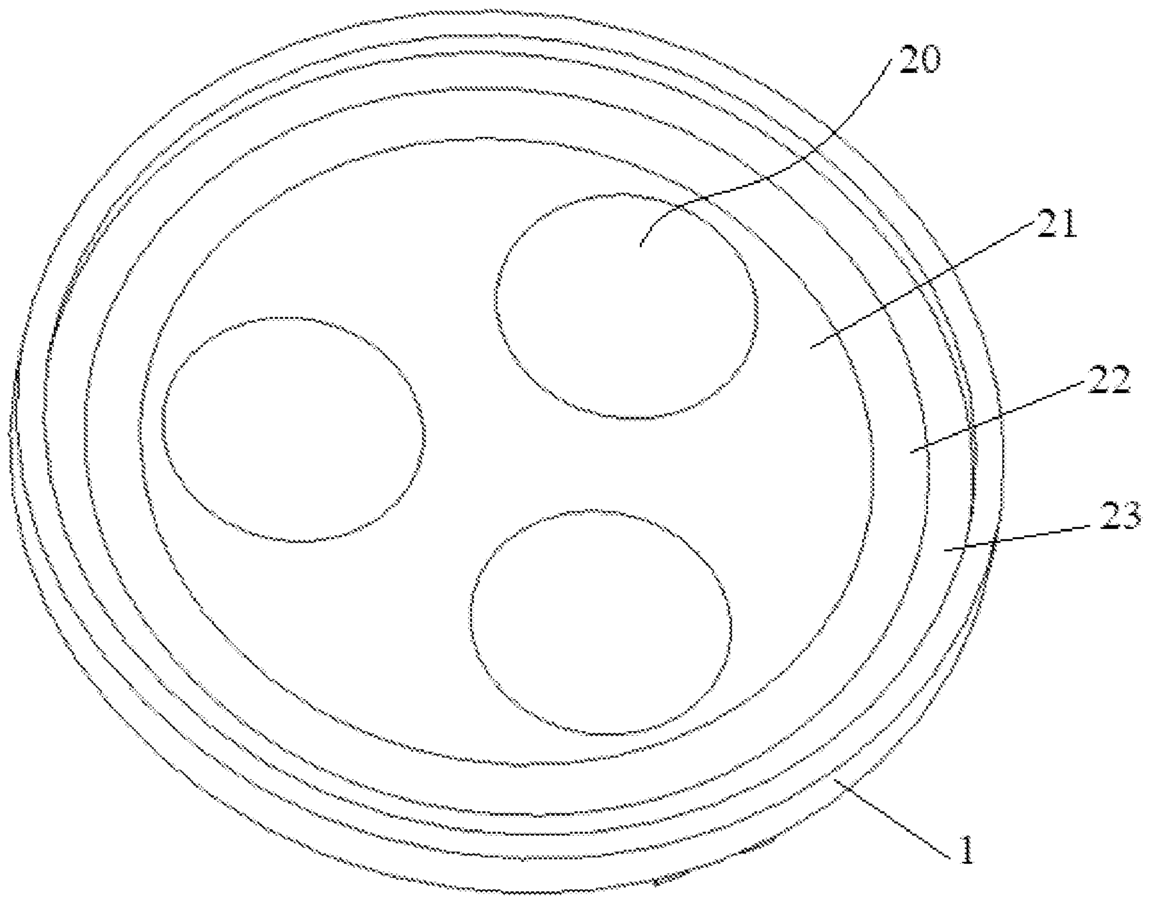
FIG. 3 is a schematic diagram of the small loudspeaker in FIG. 1 after being assembled.

This embodiment provides a small loudspeaker with multi-input-drives, which is specifically a small loudspeaker without damper. Herein, "multi-input" refers to multiple audio signal inputs, multiple audio signals are input to multiple voice coils, and the multiple voice coils jointly drive the loudspeaker to produce sound. Referring to FIG. 1 to FIG. 3, the multi-input-driving loudspeaker comprises a frame 1, a cone 2, and a plurality of input driving mechanisms 3. The cone 2 is used to vibrate to produce sound, and is fixed arranged on the frame 1. Each input driving mechanism 3 comprises a voice coil 31 and a magnetic circuit assembly for driving the voice coil 31 to vibrate; wherein, a plurality of magnetic circuit mounting holes 10 are opened on the frame 1, and at most one magnetic circuit assembly is arranged at each magnetic circuit mounting hole 10; a plurality of voice coil mounting holes 20 are opened on the cone 2, and at most one voice coil 31 is provided at each voice coil mounting hole 20. That is, the plurality of input-driving mechanisms is mounted on the frame 1 and the cone 2. There are three or more input driving mechanisms 3 to increase the driving energy of the loudspeaker, and the three or more input driving mechanisms 3 are arranged at equal intervals along a circle. The cone has a flat-sheet cone bottom 21 that is round as a whole, and the center of the circle coincides with the center of the cone bottom 21, that is, the plurality of input driving mechanisms 3 is arranged at equal intervals along the circle of the cone bottom 21. Correspondingly, three or more voice coil mounting holes 20 are opened on the cone bottom 21, the voice coil mounting holes 20 are arranged at equal intervals along a circle, and each of the voice coil mounting holes 20 is provided with one voice coil 31 so that the voice coil 31 is connected with the cone bottom 21; the frame 1 is provided with three or more magnetic circuit mounting holes 10, the magnetic circuit mounting holes 10 are arranged at equal intervals along the circle, and each of the magnetic circuit mounting holes 10 is provided with one magnetic circuit assembly. Specifically, as shown in FIGS. 1-3, the number of the input driving mechanisms 3, the voice coil mounting holes 20 and the magnetic circuit mounting holes 10 are all three, and they are evenly arranged in a ring around the center of the cone bottom 21.

In this embodiment, it is preferable to adopt a cone whose bottom is round as a whole, and the plurality of input-driving mechanisms are arranged in a ring around the center of the bottom of the cone. In some other embodiments, the cone has an oval or rectangular cone bottom, and the plurality of the input-driving mechanisms are arranged linearly or in an array.

In this embodiment, the frame 1 is made of plastic using processes such as injection molding, which is easy to form and has a certain strength, and the magnetic circuit mounting holes 10 are through holes that through the frame 1 from top to bottom. The cone 2 further comprises a tapered edge portion 22 extending obliquely upwards from the outer edge of the cone bottom 21, and the tapered edge portion 22 is arranged in a circle around the cone bottom 21. The cone 2 is made of paper pulp, plastic (such as, PP (polypropylene)), ballistic fiber or aluminum alloy, and the made cone 2 is light in weight, has good damping elasticity and rigidity, high temperature and low temperature resistance, waterproof and mildew proof. In addition, the tapered edge portion 22 of the cone 2 is fixedly connected to the frame 1 through a yoke ring 4, which is made of sponge, rubber, or cloth. With the cone 2 with the above-mentioned shape, the directional expansion width is superior to that of the traditional conical loudspeaker, and the height is lower than that of the traditional conical cone 2, which is beneficial to reducing the overall height of the loudspeaker.

Each input-driving mechanism 3 is consisted of a voice coil 31, a magnetic pole core 32, a neodymium magnetic steel 33, and a U-yoke 34. In each input-driving mechanism 3, the upper end portion of the voice coil 31 is fixedly connected to the cone 2 so as to drive the cone 2 to vibrate; the voice coil 31 passes through the corresponding magnetic circuit mounting hole 10. The U-yoke 34 has an inner cavity and an open upper end, the upper edge of the U-yoke 34 is fixedly connected at the lower surface of the frame 1 adjacent to the magnetic circuit mounting hole 10, and the magnetic circuit mounting hole 10 is in communication with the inner cavity of the U-yoke 34; the magnetic pole core 32 and the neodymium magnetic steel 33 are stacked from top to bottom, and are fixedly arranged in the inner cavity of the U-yoke 34, to form a magnetic circuit assembly; the lower surface of the magnetic pole core 32 closely contacts the upper surface of the neodymium magnetic steel 33; there are gaps between the magnetic pole the core 32 and the inner wall of the U-yoke 34 and between the neodymium magnetic steel 33 and the inner wall of the U-yoke 34, thereby form a magnetic gap surrounding both the magnetic pole core 32 and the neodymium magnetic steel 33, the lower end of the voice coil 31 is inserted into the magnetic gap downward from the magnetic circuit mounting hole 10, there is a gap between the voice coil 31 and the magnetic pole core 32 or the neodymium magnet 33, and there is also a gap between the voice coil 31 and the inner wall of the U-yoke 34, so that the voice coil 31' can move up and down in the magnetic gap.

The magnetic circuit assemblies in this embodiment adopt the aforementioned neodymium magnetic steel, which has the advantages of small volume and light weight. In some other embodiments, the aforementioned neodymium magnetic steel in the magnetic circuit assemblies can be replaced with ferrite magnetic steel, thereby reducing the cost of the magnetic circuit assemblies.

As shown in FIG. 2, multiple pairs of audio signal input terminals 5 are arranged on an edge of the frame 1, and each pair of audio signal input terminals 5 is electrically connected to leads of one voice coil 31. Wherein, each pair of audio signal input terminals 5 comprises a positive terminal and a negative terminal, one lead of each voice coil 31 is electrically connected to the positive terminal of one pair of audio signal input terminals 5, and another lead is electrically connected to the negative terminal of this pair of audio signal input terminals 5, to receive the audio signal (analog signal or digital signal) input from the pair of audio signal input terminal 5. Thus, three voice coils 31 are simultaneously driven through the four pairs of audio signal input terminals 5. By providing multiple integrated terminals for audio signal input in the frame 1, the positive and negative leads of each voice coil 31 can be connected to the terminals of the frame 1, and this connection method simplifies the manufacture of multi-input-driving loudspeakers, and is also convenient for the connection of audio signal input.

The working principle of the multi-input-driving small loudspeaker is: the audio signals are input to the plurality of voice coils 31 through the audio signal input terminals 5 on the frame 1, and the plurality of voice coils 31 move up and down synchronously under the action of the magnetic circuit assemblies, thereby driving the cone 2 to vibrate to produce sound. The multi-input-driving small loudspeaker of the present disclosure adopts a cone 2 with a flat-sheet bottom, three or more voice coil mounting holes 20 are provided on the plane formed by the cone bottom 21, and tightly fitted with three or more voice coils 31, and then the voice coils 31 are tightly fitted with the dampers 33 to form three or more input-driving mechanisms 3, and by using three or more magnetic circuit assemblies to drive the voice coils 31, and the three or more voice coils 31 to drive the cone 2, it can not only reduce the height of the product, but also broaden the directivity of the product, and through multiple audio signal inputs, it can reduce the distortion of the product, increase the sensitivity of the loudspeakers, and improve the intelligibility of the loudspeaker. The use of integrated terminals simplifies the connection of the product and facilitates the connection of audio signal input.

The small loudspeaker structure is ingenious and rational, and through the use of a flat-bottom conical cone structure, the flat-bottom conical cone has a better directivity than traditional loudspeakers; by receiving the audio signal input via three or more voice coils, the original sound reproduction and distortion are better than that of traditional loudspeakers; by adopting a flat-bottom conical cone shape, the height of the cone is lower than that of the traditional conical cone, and the reduction of the height of the cone can also reduce the height of the product; by using an input-driving structure consisted of three or more voice coils and three or more magnetic circuit assemblies, the sensitivity of the small loudspeaker is increased; by closely connecting the flat-bottom conical cone with three or more voice coils, the three or more voice coils are driven through three or more audio signal inputs to move up and down in the U-yoke magnetic circuit to drive the cone to sound.

Embodiment 2

Figure 4:
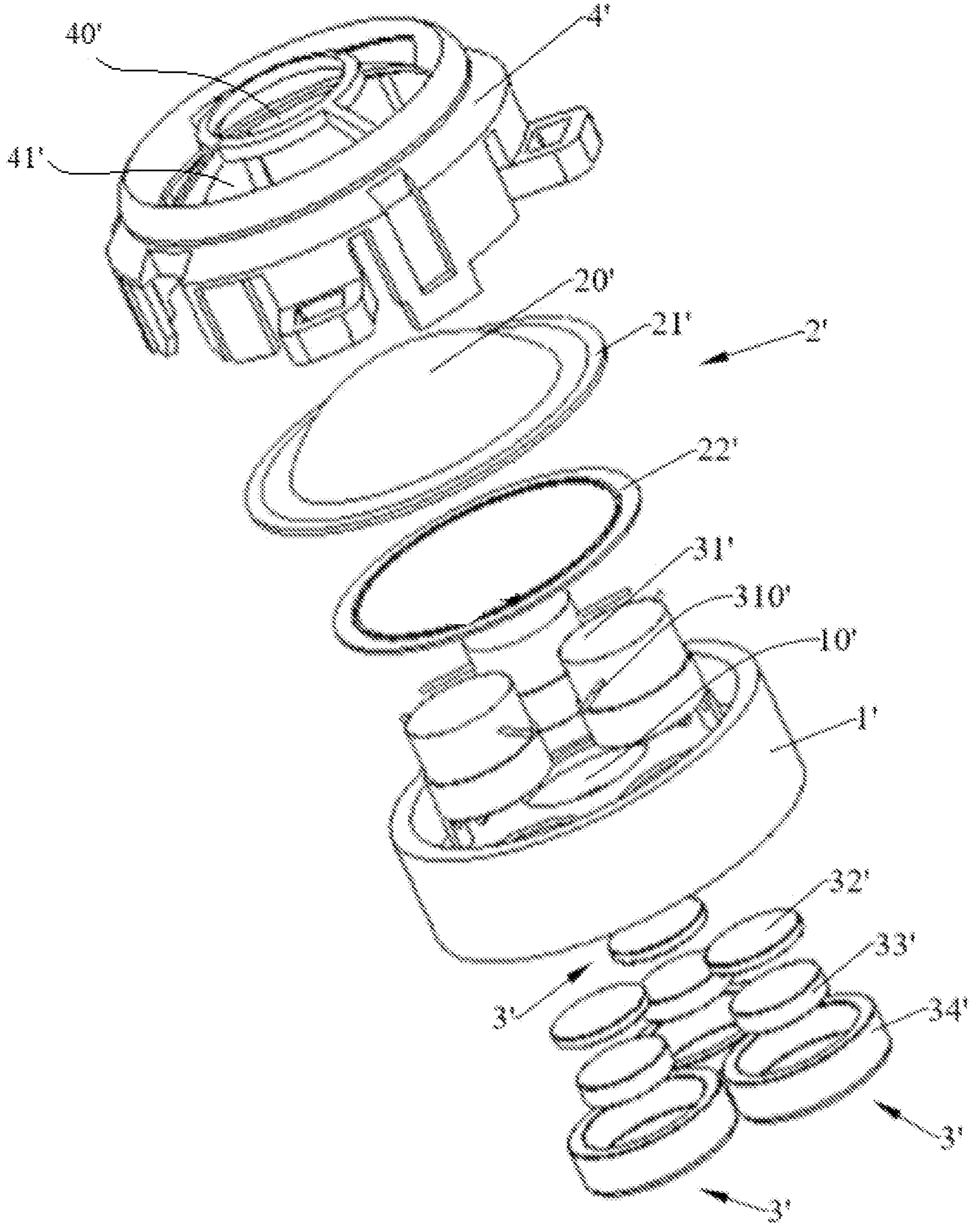
FIG. 4 is a schematic exploded view of a mid-treble loudspeaker according to Embodiment 2 of the present disclosure.
Figure 5:
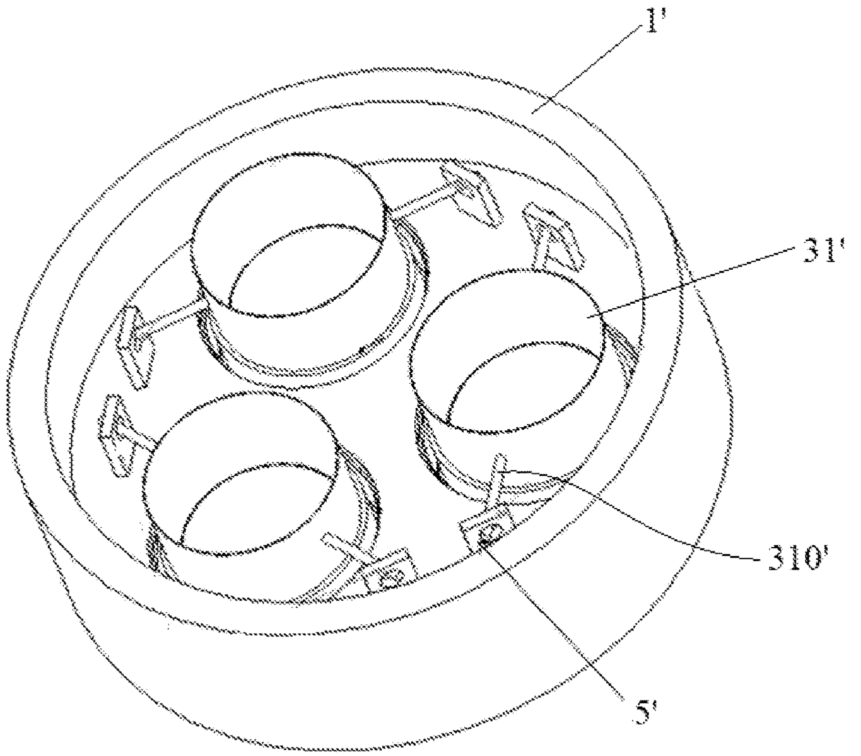
FIG. 5 is a schematic diagram of the sound membrane support in FIG. 4 after the voice coils are mounted.
Figure 6:
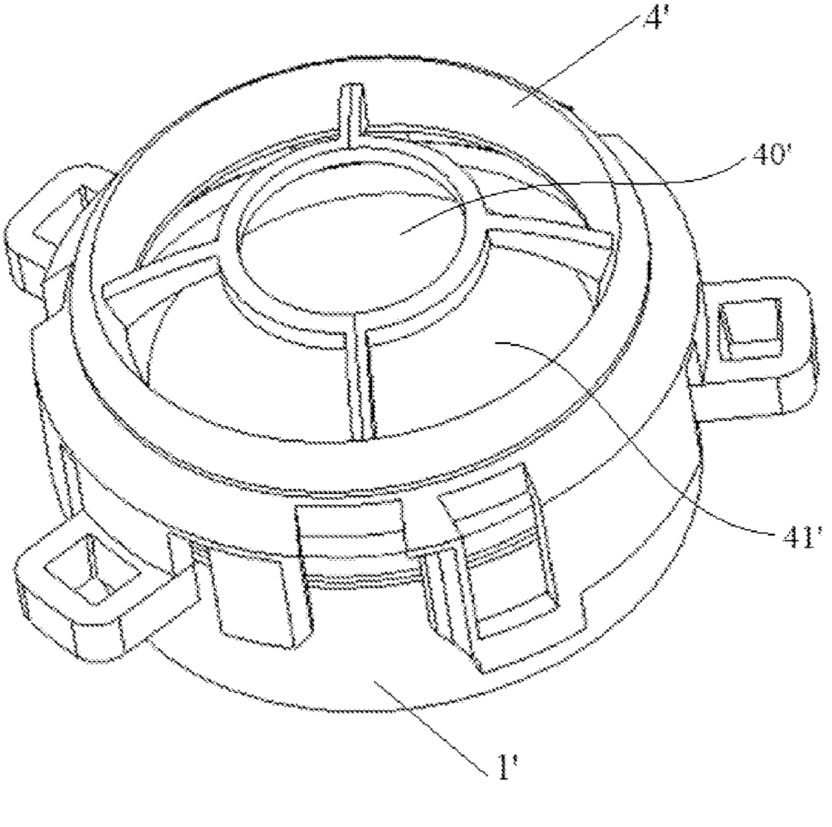
FIG. 6 is a schematic diagram of the mid-treble loudspeaker in FIG. 4 after being assembled.

This embodiment provides a mid-treble loudspeaker with multi-input-drives, which is specifically a mid-treble loudspeaker without damper. Herein, "multi-input" refers to multiple audio signal inputs, multiple audio signals are input to multiple voice coils, and the multiple voice coils jointly drive the loudspeaker to produce sound. Referring to FIG. 4 to FIG. 6, the mid-treble loudspeaker comprises a sound membrane support 1', a sound membrane 2', and a plurality of input driving mechanisms 3'. The sound membrane 2' is used to vibrate to produce sound, and is fixed arranged on the sound membrane support 1'. Each input driving mechanism 3' comprises a voice coil 31' and a magnetic circuit assembly for driving the voice coil 31' to vibrate; wherein, a plurality of magnetic circuit mounting holes 10' are opened on the sound membrane support 1', and at most one magnetic circuit assembly is arranged at each magnetic circuit mounting hole 10'; a lower portion of the sound membrane 2' is fixedly connected with a voice coil support 22', a plurality of voice coil mounting grooves (not shown) are arranged on a lower surface of the voice coil support 22', and at most one voice coil 31' is provided at each voice coil mounting groove. That is, the plurality of input-driving mechanisms are mounted on the sound membrane support 1' and the sound membrane 2'. There are three or more input driving mechanisms 3' to increase the driving energy of the loudspeaker, and the three or more input driving mechanisms 3' are arranged at equal intervals along a circle. The voice coil support 22' has a flat shape that is round as a whole, and the center of the circle coincides with the center of the voice coil support 22', that is, the plurality of input driving mechanisms 3' is arranged at equal intervals along the circumference of the voice coil support 22'. Correspondingly, three or more voice coil mounting grooves are arranged on the lower surface of the voice coil support 22', the voice coil mounting grooves are arranged at equal intervals along the circumference, and each of the voice coil mounting groove is provided with one voice coil 31' so that the voice coil 31' is connected with the voice coil support 22'; three or more magnetic circuit mounting holes 10 are opened on the sound membrane support 1', the magnetic circuit mounting holes 10 are arranged at equal intervals along the circle, and each of the magnetic circuit mounting holes 10 is provided with one magnetic circuit assembly. Specifically, as shown in FIG. 4, the number of the input driving mechanisms 3', the voice coil mounting grooves and the magnetic circuit mounting holes 10 are all three, and they are evenly arranged in a ring around the center of the voice coil support 22'.

In this embodiment, it is preferable to adopt a voice coil support 22' that is round as a whole, and the plurality of input-driving mechanisms 3' are arranged in a ring around the center of the voice coil support 22'. In some other embodiments, the voice coil support 22' is oval or rectangular overall, and the plurality of the input-driving mechanisms 3' are arranged linearly or in an array.

The sound membrane 2' has a spherical portion 20' arched upwardly and a yoke ring 21' around the outer edge of the spherical portion 20', the two are integrally formed or fixedly connected. The yoke ring 21' and the voice coil support 22' are fixedly connected, in this embodiment, the yoke ring 21' and the voice coil support 22' are bonded together so as to form a sound cavity between the spherical portion 20' and the voice coil support 22'. The voice coil support 22' is a circular flat sheet, and is fixedly connected below the spherical portion 20' through the yoke ring 21'.

Each input-driving mechanism 3' specifically is consisted of a voice coil 31', a magnetic pole core 32', a neodymium magnetic steel 33', and a U-yoke 34'. In each input-driving mechanism 3', the upper end portion of the voice coil 31' is fixedly connected to the voice coil support 22' so as to drive the voice coil support 22' and thus the sound membrane 2' connected thereto to vibrate; the voice coil 31' passes through the corresponding magnetic circuit mounting hole 10. The U-yoke 34' has an inner cavity and an open upper end, the upper edge of the U-yoke 34' is fixedly connected at the lower surface of the sound membrane support 1' adjacent to the magnetic circuit mounting hole 10', and the magnetic circuit mounting hole 10' is in communication with the inner cavity of the U-yoke 34'; the magnetic pole core 32' and the neodymium magnetic steel 33' are stacked from top to bottom, and are fixedly arranged in the inner cavity of the U-yoke 34', to form a magnetic circuit assembly; the lower surface of the magnetic pole core 32' closely contacts the upper surface of the neodymium magnetic steel 33'; there are gaps between the magnetic pole the core 32' and the inner wall of the U-yoke 34' and between the neodymium magnetic steel 33' and the inner wall of the U-yoke 34', thereby form a magnetic gap surrounding both the magnetic pole core 32' and the neodymium magnetic steel 33', the lower end of the voice coil 31' is inserted into the magnetic gap downward from the magnetic circuit mounting hole 10', there is a gap between the voice coil 31' and the magnetic pole core 32' or the neodymium magnet 33', and there is also a gap between the voice coil 31' and the inner wall of the U-yoke 34', so that the voice coil 31' can move up and down in the magnetic gap.

The mid-treble loudspeaker further comprises a sound amplifying cover 4', and the sound amplifying cover 4' is covered on the sound membrane 2' and is fixedly connected on the sound membrane support 1'. A though-hole 40' is opened on a middle portion of the sound amplifying cover 4', the sound amplifying cover 4' has a sound amplifying portion 41' surrounding the though-hole 40' and arched upwardly.

As shown in FIG. 5, multiple pairs of audio signal input terminals 5' are arranged on an edge portion of the sound membrane support 1', and each pair of audio signal input terminals 5' is electrically connected to leads of one voice coil 31'. Wherein, each pair of audio signal input terminals 5' comprises a positive terminal and a negative terminal, one lead of each voice coil 31' is electrically connected to the positive terminal of one pair of audio signal input terminals 5', and another lead is electrically connected to the negative terminal of this pair of audio signal input terminals 5', to receive the audio signal (analog signal or digital signal) input from the pair of audio signal input terminal 5'. Thus, three voice coils 31' are simultaneously driven through the four pairs of audio signal input terminals 5'. By providing multiple integrated terminals for audio signal input in the sound membrane support 1', the positive and negative leads of each voice coil 31' can be connected to the terminals of the sound membrane support 1', and this connection method simplifies the manufacture of multi-input-driving loudspeakers, and is also convenient for the connection of audio signal input.

The working principle of the multi-input-driving mid-treble loudspeaker is: the audio signals are input to the plurality of voice coils 31' through the audio signal input terminals 5' on the sound membrane support 1', and the plurality of voice coils 31' move up and down synchronously under the action of the magnetic circuit assemblies, thereby driving the voice coil support 22' and the sound membrane 2' connected thereto to vibrate to produce sound. In the mid-treble loudspeaker with multi-input-drives of the present disclosure, the sound membrane 2' is driven by three or more voice coils 31', which reduces the distortion of the product, increases the sensitivity of the loudspeaker, and improves the intelligibility of the loudspeaker. The use of integrated terminals simplifies the connection of the product and facilitates the connection of audio signal input.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

I claim:

1. A mid-treble loudspeaker with multi-input-drives, comprising:

a sound membrane support;

a sound membrane arranged on the sound membrane support;

a plurality of input driving mechanisms, each of the input driving mechanisms comprises a voice coil and a magnetic circuit assembly for driving the voice coil to vibrate, each of the magnetic circuit assemblies comprises a U-yoke having an inner cavity, a magnetic steel and a magnetic pole core arranged within the U-yoke, wherein a magnetic gap is formed between an inner wall of the U-yoke and the magnetic steel or the magnetic pole core, the voice coil is inserted in the magnetic gap and capable of moving in an up-and-down direction; and a plurality of magnetic circuit mounting holes opened on the sound membrane support, and at most one U-yoke is arranged below each magnetic circuit mounting hole, and the voice coils respectively pass through the corresponding magnetic circuit mounting holes, and lower portions of the voice coils are respectively inserted into the magnetic gaps;

wherein a lower portion of the sound membrane is fixedly connected with a flat-sheet voice coil support, a plurality of voice coil mounting grooves are opened on the voice coil support, and at most one voice coil is arranged at each voice coil mounting groove;

wherein the sound membrane has a spherical portion arched upwardly and a yoke ring around an outer edge of the spherical portion, and the yoke ring and the voice coil support are fixedly connected, such that a closed sound cavity is formed between the spherical portion and the voice coil support.

2. The mid-treble loudspeaker according to claim 1, wherein there are three or more input driving mechanisms, and the three or more input driving mechanisms are arranged at equal intervals along a circle.

3. The mid-treble loudspeaker according to claim 2, wherein the voice coil support is round as a whole, and a center of the circle coincides with a center of the voice coil support.

4. The mid-treble loudspeaker according to claim 2, wherein:

three or more voice coil mounting grooves are arranged on the voice coil support, the voice coil mounting grooves are arranged at equal intervals along the circle, and each of the voice coil mounting grooves is provided with one voice coil to connect the voice coil to the voice coil support; and three or more magnetic circuit mounting holes opened on the sound membrane support, the magnetic circuit mounting holes arranged at equal intervals along the circle, and each of the magnetic circuit mounting holes is provided with one magnetic circuit assembly.

5. The mid-treble loudspeaker according to claim 1, wherein the mid-treble loudspeaker further comprises a sound amplifying cover, and the sound amplifying cover is covered on the sound membrane.

6. The mid-treble loudspeaker according to claim 5, wherein a through-hole is opened on a middle portion of the sound amplifying cover, and the sound amplifying cover has a sound amplifying portion surrounding the through-hole and arched upwardly.

7. The mid-treble loudspeaker according to claim 1, wherein an upper edge of the U-yoke is fixedly connected to a lower surface of the sound membrane support.

8. The mid-treble loudspeaker according to claim 1, wherein each magnetic circuit assembly is composed of a U-yoke, and a magnetic pole core and a neodymium magnetic steel arranged within the U-yoke, and a lower surface of the magnetic pole core closely contacts an upper surface of the neodymium magnetic steel.

9. The mid-treble loudspeaker according to claim 1, wherein multiple pairs of audio signal input terminals are arranged on an edge of the sound membrane support, and each pair of the audio signal input terminals is electrically connected to leads of one voice coil.

10. The mid-treble loudspeaker according to claim 1, wherein the plurality of input driving mechanisms are arranged in circular, linear, or an array.

* * * * *